May 26, 1942.   F. C. HOLTZ ET AL   2,283,993
PRODUCTION INDICATING APPARATUS
Filed May 29, 1939   4 Sheets-Sheet 2

Inventors:
Frederick C. Holtz,
Charles H. Lanphier.
By
Attys.

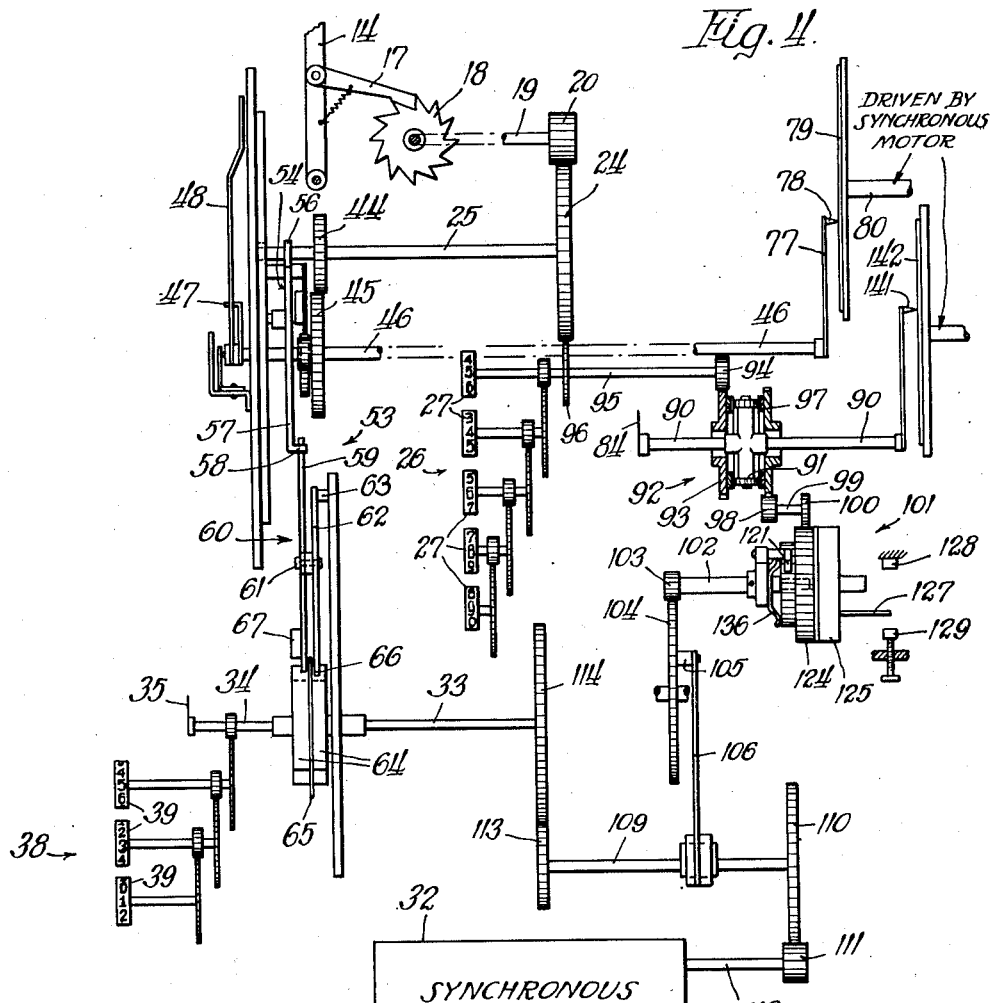

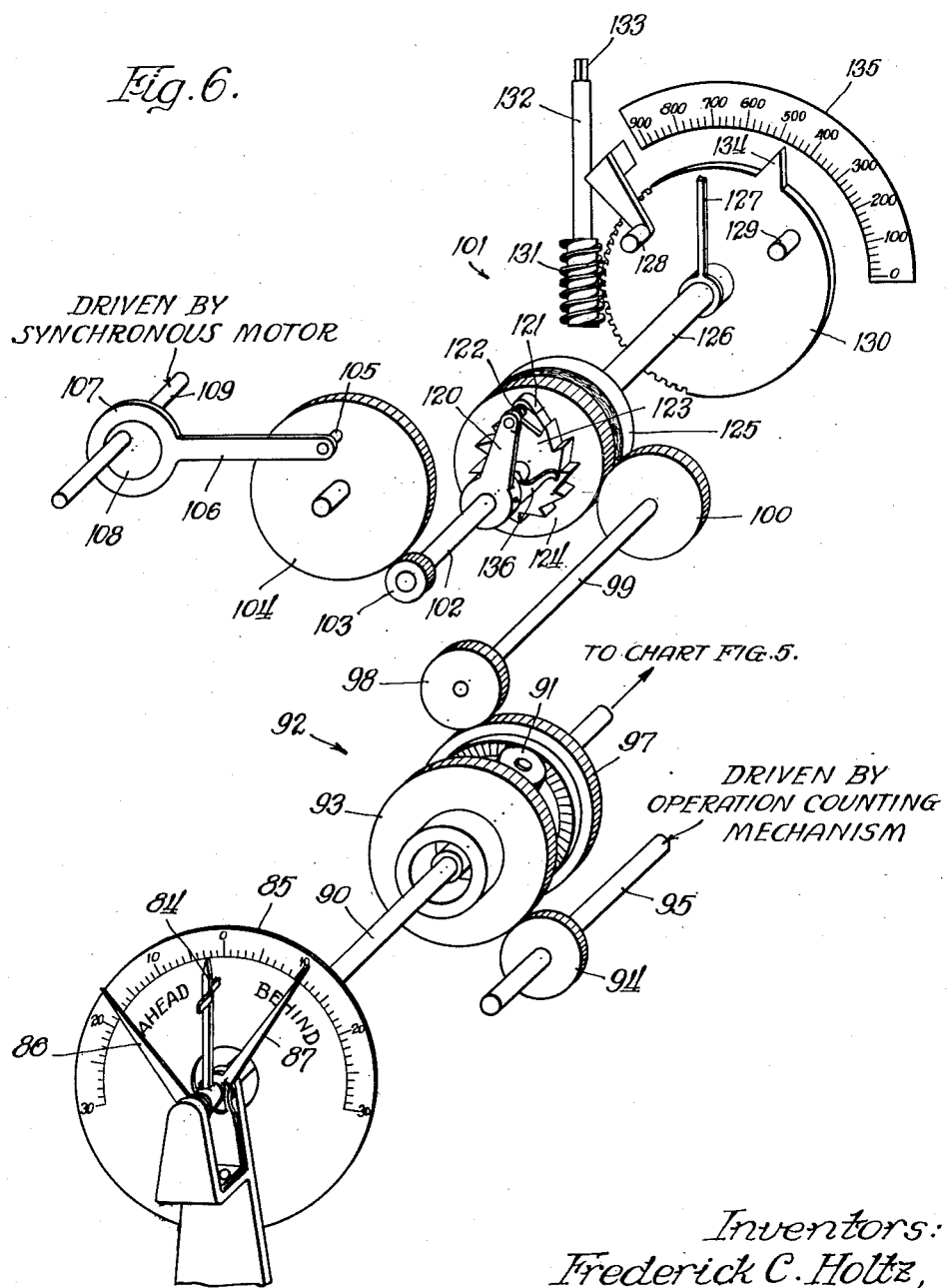

Patented May 26, 1942

2,283,993

UNITED STATES PATENT OFFICE 2,283,993

PRODUCTION INDICATING APPARATUS

Frederick C. Holtz and Charles H. Lanphier, Springfield, Ill., assignors to Sangamo Electric Company, Springfield, Ill., a corporation of Illinois Application May 29, 1939, Serial No. 276,320

2 Claims. (Cl. 235—103.5)

This invention relates, generally, to apparatus for determining and establishing varying factors related to production methods, and it has particular relation to apparatus for indicating these varying factors.

It is customary in a manufacturing plant to employ what is known as a "piece work system." This system is employed in order to give some idea of the production schedule that is being maintained, to permit estimates to be made as to when deliveries can be expected, and to provide some incentive to the workmen or operators for keeping their production at a fairly high rate. This system has other uses in connection with cost estimates, etc., that are well known.

Under this system certain rates are established. These rates are generally based upon the average time that is required by an average operator to perform a certain operation or sequence of operations, which may be considered as a single operation for the purposes of the present disclosure, in order to complete a certain piece of apparatus in so far as a particular operator is concerned. These rates are established as a result of time studies made by an observer with a stop watch. The observer notes the amount of time required to complete a particular piece of apparatus or to complete an operation. This information is used to fix the number of pieces or number of operations which should be completed or performed by an average operator in a given working period, such as a day or a shift. The operator is paid in accordance with whether or not he comes up to the standard set by this procedure. If he exceeds it, he is usually given a bonus, whereas, if he does not keep up to the schedule, he is penalized by being paid at a rate which is less than his piece work rate.

Obviously the steps that have been followed in the past for determining piece work rates are necessarily complicated and expensive. Moreover, it appears to be inherently objectionable from the standpoint of the operator to have his movements timed by the observer. Then, too, it is only natural for the operator, when undergoing such observation, to make certain that he does not exceed a schedule which he can easily maintain and which will leave him sufficient margin so that his bonus will be ample. These, however, are not the only considerations.

It is highly desirable to know exactly how production rates vary from time to time throughout a day or shift for different operators in order to more efficiently control the working conditions and layout of the plant. By noting certain uniform changes in the production rates of the operators at different times, or in different locations, it is possible to make corresponding changes in working conditions or plant layout, as may be necessary in order to prevent these fluctuations. The prior more or less rule of thumb methods for determining piece work rates and production schedules did not provide sufficiently accurate information as would permit more complete and economic control of the varying production factors.

Accordingly, the object of this invention is to indicate for a workman or an operator during a working period, such as a day or a shift, some or all of the following varying production factors:

1. The elapsed portion of a production interval, such as a quarter or half hour.
2. The elapsed portion of the working period.
3. The maximum number of operations performed by the operator in a production interval.
4. The number of operations performed in each production interval by recording the same on a chart.
5. The total number of operations performed from the beginning of the working period.
6. The extent that the operator is ahead of or behind schedule.
7. The maximum number of operations that the operator has been ahead of schedule.
8. The maximum number of operations that the operator has been behind schedule.
9. The number of operations that the operator has been ahead of or behind schedule, by recording the same on a chart.

In order to accomplish these objects, it is necessary only to provide some counting mechanism which will be operated each time that the operator completes a piece or performs an operation, and a timing mechanism which operates at a constant speed, such as a synchronous motor energized from an alternating current source of fixed frequency. The counting mechanism may be operated as a result of the closure or opening of contact members in response to the movement of a finished piece past a given point, or in response to the completion of an operation. It may also be operated by intercepting a beam of light. The timing mechanism may be operated, as indicated, by a synchronous motor, such as a motor of this type that is now widely used in clocks and other timekeeping apparatus.

According to one embodiment of the invention only the first five enumerated objects are accomplished. The timing mechanism is arranged to operate a pointer through one revolution which corresponds to a production interval, one revolution being completed in a given time, such as a quarter or a half hour. At the same time, another indicating means is operated which shows the total time that has elapsed since the beginning of the working period. Preferably, it registers in hours and fractions thereof.

The counting mechanism is arranged to drive a maximum production rate indicator along a scale which is calibrated in number of pieces or operations performed in a given production interval. At the end of each interval the operative connection between the indicator and the counting mechanism is released, the indicator remaining in the maximum position to which it has been operated, while the counting mechanism, in part, returns to the zero position. If the number of operations in the next production interval is less than the number of operations in the preceding interval, then the indicator will not be further advanced. Likewise, if the number of operations in the next interval is greater than the number in the preceding interval, then the indicator will be advanced by an amount corresponding to the difference. The indicator is advanced by a pusher arm, the forward movement of which is controlled by the counting mechanism and which is retracted periodically.

By coupling a pin or needle to the pusher arm and causing it to move conjointly therewith over a chart that is driven at a predetermined speed, as by the synchronous motor, it is possible to obtain a permanent record of the number of operations that have been completed in each production interval. The chart will then show exactly how the production rate of the operator varied in each production interval, which information is not provided by the maximum production rate indicator.

The number of pieces made or operations completed are totalized by suitable indicating means, such as tachometer wheels. These are continuously advanced, the reading at the beginning of the working period subtracted from the reading at the end thereof giving the total number of pieces made or operations completed during the working period.

The entire nine objects are accomplished by means of another embodiment of the invention. The first five objects are accomplished by means as previously outlined. The remaining four objects may be accomplished by the following generally described apparatus.

It is important that the operator know at any time whether he is ahead of or behind the schedule that has been set for him. For this purpose a pace-setting indicator is provided which moves in one direction or the other, depending upon whether the operator is ahead of or behind schedule. The pace-setting pointer is driven by the piece or operating counting mechanism on the one hand, and by the timing mechanism on the other hand. The former operates in accordance with the number of pieces made or operations completed, while the latter operates at a fixed speed which corresponds to the schedule that should be maintained. The pace-setting indicator moves relative to a scale having a zero center and calibrated in units of number of operations or pieces ahead of and behind schedule. Also cooperating with the pace-setting indicator is a pair of additional indicators, one being moved by the pace-setting indicator when it moves in one direction and the other being moved when it moves in the opposite direction. These indicators remain in the positions to which they have been moved by the pace-setting indicator, thereby providing an indication of the maximum departure of the operator from the set schedule.

A permanent record of the number of operations that the operator has been ahead of or behind schedule is provided by a pin or pointer that is moved, together with the pace-setting indicator, over a chart that is rotated at a fixed speed by the timing mechanism. The record on the chart shows just when and how much the operator has departed from the predetermined schedule.

For a more complete understanding of the nature and scope of the invention, reference may be had to the following detailed description, taken in connection with the following drawings, in which:

Figure 4 illustrates diagrammatically another embodiment of the invention in which all nine of the objects are accomplished;

Figure 5 is a detail elevational view of one of the charts and the associated pin or pointer employed in the embodiment shown in Figure 4 for indicating the number of operations that the operator has been ahead of or behind schedule; and Figure 6 is a view showing, in perspective, certain of the details of the variable motion mechanism illustrated in Figure 4.

Figure 1:
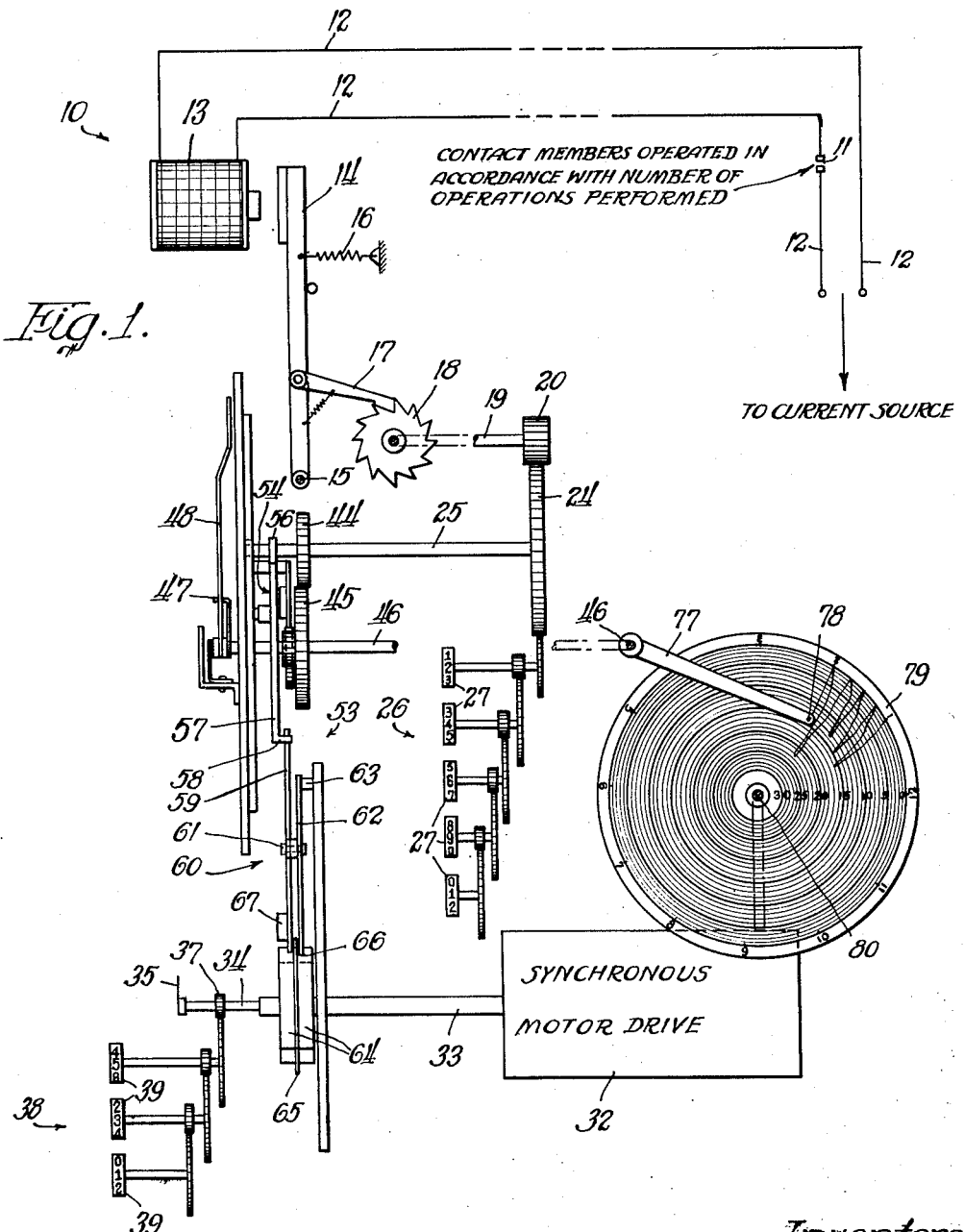
Figure 1 illustrates diagrammatically one embodiment of the invention which is arranged to accomplish the first five enumerated objects.

Referring now particularly to Figure 1 of the drawings, it will be observed that the reference character 10 designates, generally, an operation counting mechanism which includes a set of contact members 11 interposed in one of a pair of conductors 12 that may be connected to a suitable current source, such as a 60-cycle, 110-volt source. As shown, the conductors 12 are connected to energize an operating winding 13 for attracting an armature 14 that is pivoted at 15 and biased away from the winding 13 by a tension spring 16. The armature 14 carries a pawl 17 which cooperates with a ratchet wheel 18 mounted on a shaft 19 that carries a pinion 20. It will be understood that the armature 14 is attracted each time that the contact members 11 are closed and on their being opened, the armature 14 is released, thereby advancing the ratchet wheel 18 one notch.

It will be obvious that the counting mechanism 10 may assume various forms. The one shown is merely for illustrative purposes. It will be understood that the contact members 11 are closed by any suitable means. For example, they may be closed each time that the machine controlled by an operator performs a certain function which indicates that a piece of apparatus has been made or a certain operation or sequence of operations has been completed. Likewise, the interception of a beam of light by the movement of the completed piece, or otherwise, may be employed to control the operation of the counting mechanism. The principal requisite of any counting mechanism that may be employed is that it will drive an element, such as the pinion 20, at a speed which corresponds to the number of pieces of apparatus made or the number of operations that have been performed by an operator.

It will be observed that the pinion 20 meshes with a gear wheel 24 carried by a shaft 25. The gear wheel 24 is arranged to drive the operation totalizing indicating means, illustrated generally at 26. This totalizing means may include tachometer wheels 27 that are arranged to be driven, one by the other, either periodically or directly, as will be readily understood. The tachometer wheels 27 are arranged to register with suitable apertures 28 in a dial plate 29, shown in Figure 2 of the drawings. It will be understood that the wheels 27 are provided with numerals in the usual manner and that the numerals which are visible through the windows 28 go to make up the total number of operations that have been counted by the operation counting mechanism 10.

In addition to the provision of the operation counting mechanism 10, there is also provided means which operates at a predetermined speed, such as a clock mechanism. For this purpose a synchronous motor drive 32 is provided having an operating shaft 33. It will be understood that the synchronous motor drive includes a suitable synchronous motor with the necessary gear reduction for driving the shaft 33 at a relatively slow speed. While a synchronous motor drive has been indicated, it will be understood that a spring motor drive could be employed without departing from the scope of this invention.

Figure 2:
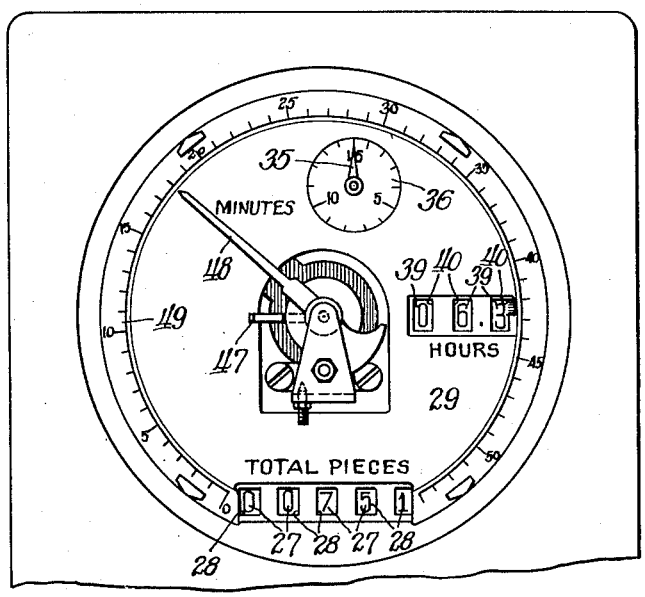
Figure 2 is a view, in front elevation, of the face of the instrument shown diagrammatically in Figure 1.

The shaft 33 is provided with an extension 34 that carries a time interval indicator 35 in the form of a pointer, as shown more clearly in Figure 2 of the drawings. The indicator 35 cooperates with a scale 36 which, in the embodiment shown in the drawings, is so calibrated that one revolution of the indicator 35 takes place in a quarter hour. This time will be termed herein as a production interval and it will be understood that it may be longer or shorter, as may be desired. The quarter hour production interval, however, has been found to be satisfactory in some instances.

Since it is desirable to provide an indication of the total time that has elapsed since the beginning of the working period, such as the beginning of the working day or shift, the total time indicating means, shown generally at 38, Figure 1, is provided. The time indicating means 38 includes tachometer wheels 39 that are provided with numerals, as indicated in Figure 2 of the drawings, and they register with apertures 40 in the dial plate 29. It will be observed that the wheels 39 show the total number of hours and tenths of hours that have elapsed since the beginning of the working period.

With a view to indicating the maximum number of operations that have been performed in a production interval, the shaft 25 is provided with a gear wheel 44 which meshes with a gear wheel 45 carried by a shaft 46 that has at its outer end a pusher arm 47. The pusher arm 47 is arranged to engage and move a maximum production rate indicator 48 which, as illustrated more clearly in Figure 2 of the drawings, moves with reference to a scale 49 that is calibrated in number of operations that have been performed in a production interval. The scale 49 is made so that it can be easily removed so as to substitute another scale having a different calibration. The maximum production rate indicator 48 is in the form of a friction pointer which, while it may be readily moved by the pusher arm 47, stays in any position to which it has been operated thereby.

Figure 3:
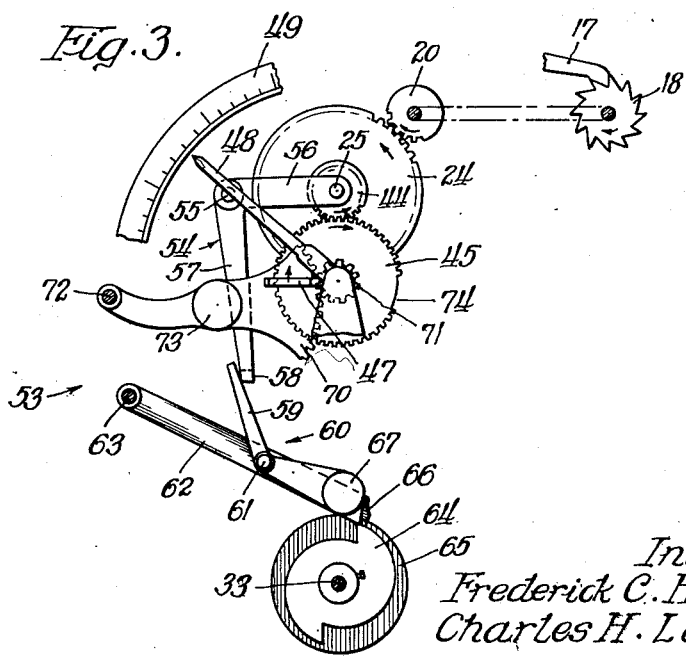
Figure 3 is a detail elevational view of the resetting mechanism.

As previously indicated, the pusher arm 47 is reset to its initial position at the end of each production interval. For this purpose the resetting mechanism shown in detail in Figure 3 is provided. The resetting mechanism is designated generally by the reference character 53. It includes an L-shaped lever 54 that is pivoted at 55 and has one arm 56 in which one end of the shaft 25 carrying the pinion 44 is pivoted. The L-shaped lever 54 is rotated slightly about its pivot axis to disengage the pinion 44 from the gear wheel 45. Another arm 57 of the L-shaped lever 54 is provided with an inturned section 58 that is positioned in the path of an arm 59 of a lever 60 which is pivoted at 61 on another lever 62 that, in turn, is pivoted at 63. The lower ends of the levers 60 and 62 engage cams 64 which are positioned on opposite sides of a disc 65 and carried and driven by the shaft 33 (Figure 1), which, it will be recalled, is driven by the synchronous motor drive 32. As shown at 66, the lever 62 extends slightly beyond the lever 60 so that, on the rotation of the cams 64, the lever 60 first is released and rotates in a clockwise direction as urged by a weight 67. This rotation of the lever 60, while the lever 62 is relatively stationary, causes the L-shaped lever 54 to rotate slightly in a counterclockwise direction since the arm 59 engages the inturned section 58, thereby lifting the pinion 44 out of driving engagement with the gear wheel 45. The gear wheel 45 and the pusher arm 47 then are free to rotate back to the initial position. This reverse rotation is accomplished by means of a toothed sector 70 which meshes with a pinion 71 that is fastened onto the shaft 46. The sector 70 is pivoted at 72 and carries a weight 73 for promptly rotating the pinion 71 and the gear wheel 45, together with the pusher arm 47, back to the initial position. Shortly after the pusher arm 47 has been restored to the initial position, the extended end 66 of the lever 62 drops off of its cam 64 and the L-shaped lever 54 is restored to the position shown in Figure 3, where the pinion 44 will again engage and drive the gear wheel 45. The gear wheel 45 is provided with a mutilated section 74 in order to limit its movement in the event that the number of operations counted by the operation counting mechanism 10 should exceed the number indicated by the scale 49.

In order to indicate the number of operations performed in each production interval and to record the same, the pusher arm shaft 46 is extended rearwardly and has mounted thereon for movement therewith a pen arm 77 carrying a pen or pointer 78. The pen or pointer 78 is arranged to trace a mark, as shown, on a chart 79 that is suitably mounted to be driven by a shaft 80 from the synchronous motor drive 32 or any other suitable timing mechanism. It will be observed that the chart 79 is calibrated radially in units indicating the number of operations that have been performed in a production interval and that it is calibrated about its circumference in hours. Since the movement of the pen arm 77 corresponds to the movement of the pusher arm 47, the trace on the chart 79 will provide a permanent record of the number of operations completed by the operator in each production interval.

If the permanent record of operations is not required, then the chart 79 can be dispensed with. However, it is desirable to use it in order to provide a complete record.

It is desirable to provide the operator with a constant indication of whether or not he is ahead of or behind the schedule that has been set up for him. A glance at such an indicator will indicate to him just where he stands with respect to the production schedule. For this purpose the apparatus shown in Figures 1, 2 and 3 has been modified somewhat to provide this added feature, as shown in Figures 4, 5 and 6, to which reference will now be had.

As shown in Figures 4 and 6, a pace-setting indicator 84, in the form of a pointer, is arranged to move relative to a scale 85 having a zero center and calibrated in number of operations ahead of and behind schedule. In order to provide an indication of the maximum number of operations which the operator has been ahead of and behind schedule, indicators 86 and 87 in the form of friction pointers, are provided which, as illustrated, are arranged to be moved by the pace-setting indicator 84. Indicators 86 and 87 are arranged to remain in the maximum positions to which they have been operated by the pace-setting indicator 84. It is then possible to tell at a glance how far ahead of and behind schedule the operator has been during a working period. It will be understood that at the beginning of each working period the indicators 86 and 87, together with the pace-setting indicator 84, are restored to the zero position.

The pace-setting indicator 84 is mounted for rotation with a shaft 90 that carries planet wheels 91 forming a part of a differential gear assembly, shown generally at 92. The differential gear assembly 92 includes a sun wheel 93 which is in driving engagement with the planet wheels 91 and which is driven by a pinion 94 mounted on a shaft 95. The shaft 95 is provided with a gear wheel 96 which meshes with the gear wheel 24 on the shaft 25 that is driven by the operation counting mechanism 10, previously described. It will now be understood that the sun wheel 93, forming a part of the differential gear assembly 92, is directly driven by the operation counting mechanism and that the rotation of this sun wheel tends to rotate the pace-setting indicator 84 in the same direction, i. e., in a direction indicating that the operator is ahead of the schedule that has been established for him.

The differential gear assembly 92 also includes a second sun wheel 97 which engages and is driven by a pinion 98 carried on a shaft 99 on which there is provided a gear wheel 100. It will be observed that the gear wheel 100 is driven by a variable motion mechanism, shown generally at 101, which will be presently described and that this mechanism is driven by a shaft 102 carrying a pinion 103 which meshes with a gear wheel 104. The gear wheel 104 is provided with a pin 105 and is arranged to be oscillated by a crank arm 106. Obviously a gear sector could be employed for the gear wheel 104, since it never is rotated through a complete revolution. The crank arm 106 is provided with an integrally formed ring 107 within which a circular cam 108, eccentrically mounted on a shaft 109, rotates. It will be understood that the crank arm 106 will be oscillated on rotation of the shaft 109, which, as indicated, is driven at a constant speed by the synchronous motor 32, by virtue of the eccentric relationship of the circular cam 108 with respect to the shaft 109 and its position within the ring 107. Accordingly, the gear wheel 104 is likewise oscillated, as are the pinion 103 and the shaft 102.

As shown in Figure 4 of the drawings, the shaft 109 is provided with a gear wheel 110 which meshes with a pinion 111 carried by a shaft 112 that is driven by the synchronous motor drive 32. As previously indicated, any suitable timing mechanism can be employed instead of a synchronous motor. For example, a spring driven clock mechanism can be employed. The shaft 109 is also provided with a gear wheel 113 which meshes with a gear wheel 114 that is carried by the shaft 33, previously described.

If it were not for the fact that it is desirable to provide in a single apparatus means for accommodating it to widely varying production rates, then the variable motion mechanism 101 could well be omitted. In such case the sun wheel 97 of the differential gear assembly 92 would be directly driven by the synchronous motor drive 32. However, since production rates of different operators will vary, and further, since for different types of work the production rate will vary, it is desirable to provide some means for adapting the apparatus for these different operating conditions. While the variable motion mechanism is interposed between the synchronous motor drive and the differential gear assembly 92, it will be understood that it can as well be interposed between the operation counting mechanism and the differential gear assembly 92.

In general, the variable motion mechanism 101 provides for varying the amount of rotation that is imparted to the differential gear assembly 92 from the mechanism that drives it. The variable motion mechanism 101 includes an arm 120 that is fastened to the shaft 102 and oscillates therewith. The arm 120 carries a pawl 121 that is urged by a spring 122 into engagement with the teeth of a ratchet wheel 123 that is mounted to rotate freely on the shaft 102. The ratchet wheel 123 is fastened to a clutch plate 124 that engages a second clutch plate 125 which is fastened to a tubular shaft 126, freely rotatable upon the shaft 102. An arm 127 is carried by the shaft 126 and is arranged to oscillate therewith, its arc of oscillation being between a stationary stop 128 and an adjustable stop 129 that is carried by a gear wheel 130.

By adjusting the position of the stop 129 relative to the stationary stop 128, it is, of course, possible to vary the throw of the arm 127 and likewise the movement of the ratchet wheel 123 with respect to the shaft 102. The position of the gear wheel 130 carrying the adjustable stop 129 is adjustable by a worm 131 which meshes therewith. As shown, the worm 131 is mounted on a shaft 132 having a squared end 133 to permit the application of a wrench for adjusting it, as will be readily understood. The gear wheel 130 is provided with an index 134 which cooperates with a scale 135 that is calibrated, for example, in number of operations per hour.

On the forward movement of the oscillating gear wheel 104, the arm 120 fastened to the shaft 102 operates the ratchet wheel 123 in a clockwise direction and at the same time causes the rotation of the gear wheel 100 in a counterclockwise direction. The sun wheel 97 of the differential gear assembly 92 is then rotated in such direction as to cause the pace-setting indicator 84 to rotate in a counterclockwise direction or, relative to the scale 85, in a direction indicating that the operator is behind the schedule that has been established for him. When the arm 127 engages the adjustable stop 129, the clutch plate 124 slips relative to the clutch plate 125. On the reverse rotation of the gear wheel 104, the arm 120 is rotated in a counterclockwise direction and sufficient friction is provided between the pawl 121 and the ratchet wheel 123 to cause the latter to also rotate in a counterclockwise direction until the arm 127 engages the stationary stop 128. In order to insure that sufficient friction will be present, a friction spring 136 may be provided between the arm 120 and the face of the ratchet wheel 123. The friction between the clutch plates 124 and 125 is then sufficient to prevent further movement in a counterclockwise direction of the ratchet wheel 123 with the arm 120, and, therefore, the pawl 121 slips over the teeth of the ratchet wheel 123. The distance that the arm 120 moves relative to the ratchet wheel 123 controls the amount that the sun wheel 97 of the differential gear mechanism 92 is advanced during a complete forward and reverse movement of the gear wheel 104 by the eccentrically operated arm 106. In turn, this forward movement will depend upon the distance between the stationary and adjustable stops 128 and 129, as will be readily understood. Thus, when the stop 129 is so located that the index 134 corresponds with the zero position on the scale 135, then no forward movement of the sun wheel 97 of the differential gear assembly 92 will take place. Likewise, the maximum forward movement of the sun wheel 97 will take place when the index 134 is moved to the highest point on the scale 135, where no movement of the arm 127 between the stops 128 and 129 is permitted.

With a view to providing a record of how far the operator has been ahead of and behind schedule during the working period, the shaft 90 may be provided with a pen arm 140 that is movable with the pace-setting indicator 84. The pen arm 140 is provided with a pen or pointer 141 that is arranged to make a trace on a chart 142 that is driven at a fixed speed. For example, it may be driven by a shaft 143 from a suitable clock mechanism such as the synchronous motor drive 32. It will be observed that the chart 142 is calibrated in opposite directions from a point midway between the center and the circumference, to indicate the number of operations behind and ahead of schedule. Circumferentially, the chart 142 is calibrated in hours.

Since certain further changes may be made in the foregoing constructions and different embodiments of the invention can be made without departing from the scope thereof, it is intended that all matter shown in the accompanying drawings or described hereinbefore shall be interpreted as illustrative, and not in a limited sense.

What is claimed as new is:

1. Production indicating apparatus comprising in combination, a pointer and a scale relative to which the same is movable and calibrated in number of operations in a production interval, said pointer being adapted to remain in any position with respect to said scale to which it is moved, means disposed to be operated each time an operator completes an operation, a member movable from an initial position toward said pointer, mechanism operatively interconnecting said means and said member for advancing the latter in accordance with the number of operations completed by the operator, continuously operable timing means, means operatively interconnecting said timing means and said movable member for resetting the same to its initial position at the end of each production interval, an indicator and a scale relative to which the same is movable and calibrated in time units of a production interval, and means operatively interconnecting said timing means and said indicator, said indicator being arranged to occupy a position corresponding to the beginning of a production interval at the time that said member is reset to its initial position and to indicate to the operator the portion of the production interval remaining during which he can change the number of operations performed so as to cause said movable member to reach said pointer at the end of the production interval.

2. Production indicating apparatus comprising in combination, a scale calibrated in number of operations in a production interval, means disposed to be operated each time an operator completes an operation, a member movable relative to said scale from an initial position, mechanism operatively interconnecting said means and said member for advancing the latter relative to said scale in accordance with the number of operations completed by the operator, continuously operable timing means, means operatively interconnecting said timing means and said movable member for resetting the same to its initial position at the end of each production interval, an indicator and a scale relative to which the same is movable and calibrated in time units of a production interval, and means operatively interconnecting said timing means and said indicator, said indicator being arranged to occupy a position corresponding to the beginning of a production interval at the time that said member is reset to its initial position and to indicate to the operator the portion of the production interval remaining during which he can change the number of operations performed so as to cause said movable member to reach a predetermined position with respect to the first mentioned scale at the end of the production interval.

FREDERICK C. HOLTZ.
CHARLES H. LANPHIER.